United States Patent [19]

Babb

[11] 4,369,858
[45] Jan. 25, 1983

[54] HUNTER'S TREE STAND AND SEAT

[76] Inventor: Alvin A. Babb, 106 Walnut St., Smyrna, Tenn. 37167

[21] Appl. No.: 234,488

[22] Filed: Feb. 17, 1981

[51] Int. Cl.³ ............... A01M 31/02; A45F 3/26; A47C 9/10
[52] U.S. Cl. ................................. 182/134; 182/187
[58] Field of Search ............ 182/187, 188, 134, 135, 182/133, 136

[56] References Cited

U.S. PATENT DOCUMENTS

| 3,065,821 | 11/1962 | Hundley | 182/187 |
|---|---|---|---|
| 3,419,108 | 12/1968 | Mobbs | 182/187 |
| 3,485,320 | 12/1969 | Jones | 182/187 |
| 3,856,111 | 12/1974 | Baker | 182/187 |
| 3,871,482 | 3/1975 | Southard | 182/187 |
| 3,955,645 | 5/1976 | Dye | 182/187 |
| 4,009,763 | 3/1977 | Hunter | 182/187 |
| 4,120,379 | 10/1978 | Carter | 182/187 |
| 4,134,474 | 1/1979 | Stavenau | 182/187 |
| 4,236,602 | 12/1980 | Leggett | 182/187 |

Primary Examiner—Reinaldo P. Machado
Attorney, Agent, or Firm—B. P. Fishburne, Jr.

[57] ABSTRACT

A comfortable folding or drop seat attachment for a known type of hunter's platform is provided and enables utilization of an existing pivot axis on the folding frame of the stand. Sturdy, lightweight adapter legs embrace side members of a seat panel and rest securely on underlying inclined frame sides of the stand without danger of slippage during use. Simplicity and economy of manufacturing are featured.

5 Claims, 4 Drawing Figures

HUNTER'S TREE STAND AND SEAT

BACKGROUND OF THE INVENTION

Prior U.S. Pat. Nos. 3,856,111 and 3,955,645, Baker and Dye, disclose tree-supported platforms for hunters and coacting tree climbing accessories. In the Baker device, the tree climbing accessory serves as a rather crude rest or seat for the hunter after the hunter reaches the desired elevation. The seat is not level, very small and uncomfortable. In the Dye structure, a folding fabric seat is provided on the platform, and while comfort is slightly enhanced, the seat structure lacks stability and still leaves much to be desired in the way of a secure and safe seating means on platforms of this type.

It is the object of this invention to fully satisfy this need in an efficient, safe and economical manner so as to provide good comfort and stability in a seat attachment structure without necessitating alteration of the basic known platform structure as shown in the Baker patent.

Other objects and advantages of the invention will become apparent during the course of the following detailed description.

DETAILED DESCRIPTION

Figure 1:
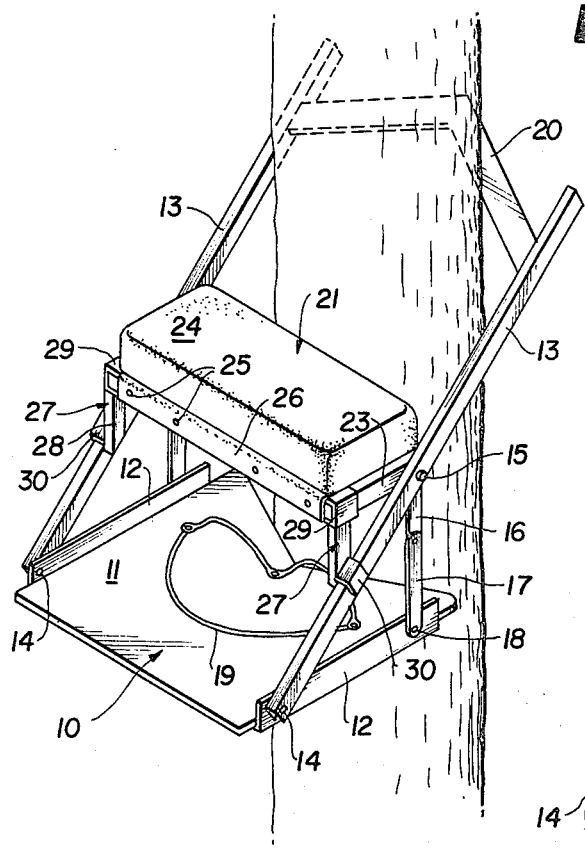
FIG. 1 is a perspective view of the invention in a use position.

Referring to the drawings in detail wherein like numerals designate like parts, a hunter's stand or platform assembly 10 substantially as shown in U.S. Pat. No. 3,856,111 is utilized without significant alteration. Briefly, this platform includes a body portion 11 which is level during use with attached parallel side bar members 12 being provided. Side frame members 13 have their lower ends pivoted at 14 to the bar members 12. At intermediate points along their lengths, the side frame members carry pivot elements 15 pivotally connected to upper folding links 16, in turn pivoted to lower folding links 17, whose lower ends are pivotally attached at 18 to the bar members 12 to form a platform folding arrangement in accordance with the Baker patent. Foot engaging flexible loop means 19 is provided on the platform body portion to enable the tree climbing operation disclosed in the Baker patent with the aid of a hand-held accessory not shown in the drawings. A blade structure 20 connected between two side frame members 13 facilitates the climbing operation and also coacts with the body portion 11 in securely supporting the assembly 10 at any chosen elevation on a tree. All of this structure remains unchanged in the present invention.

Figure 3:
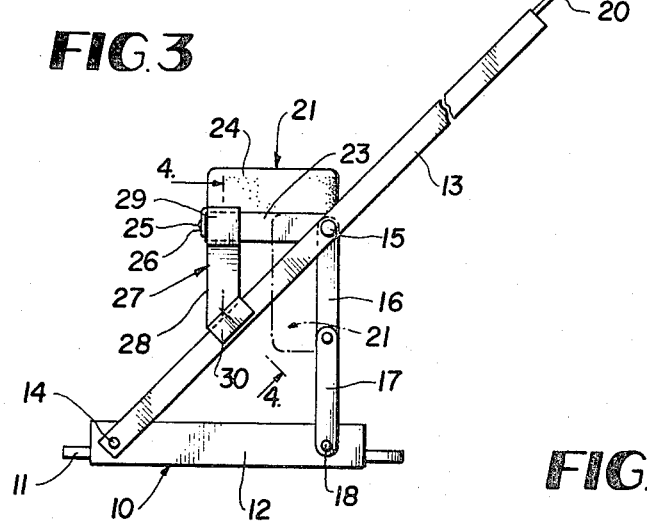
FIG. 3 is a side elevation of the invention as shown in FIG. 1.
Figure 4:
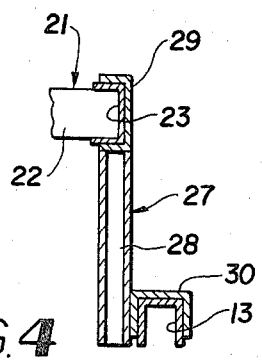
FIG. 4 is an enlarged fragmentary section taken on line 4—4 of FIG. 3.

In accordance with this invention, the existing pivot elements 15 or elongation thereof are utilized to pivotally support a comfortable solid drop seat 21 which is held in a level position, FIGS. 1 and 3, when serving as a seat, and drops by gravity to a vertical position when the hunter is standing or engaged in climbing the tree, as described in the Baker patent.

The drop seat 21 comprises a rigid panel 22 preferably having side channels 23 attached to it. A comfortable seat cushion 24 is removably attached to the panel 22 as by snap fasteners 25 carried by flaps 26, or by equivalent means.

A key feature of the invention resides in the provision of a pair of unique removable adapter legs 27 each having a tube or channel body portion 28 which is vertical during use, FIGS. 1 and 3, and each having upper and lower channel engaging elements 29 and 30 rigidly secured thereto as by welding. The lower engaging elements 30 are fixed at an angle of 45 degrees to the axes of the adapter legs and 45 degrees to the channel axes of the upper engaging elements 29, as best shown in FIG. 3. The adapter legs 27 are rigid, strong and lightweight. They are small enough to be carried in the pocket of a coat.

When the seat 21 is raised to the level position, the top channel engaging elements 29 are merely slipped over the side channels 23 of the seat panel and the bottom engaging elements 30 are slipped over the frame sides 13 of the Baker platform assembly. No screws or other fasteners are needed. The adapter legs cannot slip once in place due to the angular relationship of the elements 29 and 30. They are very secure and safe and the resulting seat structure will support any hunter with relative comfort and security.

Figure 2:
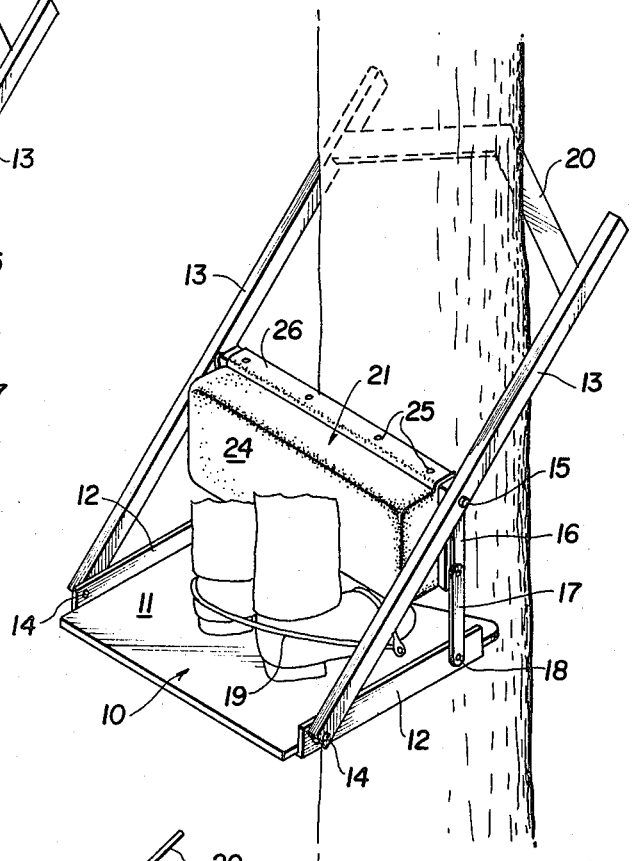
FIG. 2 is a similar view of the invention in a climbing position.

When it is desired to climb, the adapter legs 27 are merely pulled off and the seat will drop by gravity to the vertical position shown in FIG. 2.

Since the existing pivots 15 are utilized and the adapter legs 27 require no fasteners, it is unnecessary to cut, alter or otherwise mutilate the Baker platform assembly 10 to utilize the present invention.

It can now be appreciated that the main objective of providing a comfortable, safe, stable and convenient seat to the hunter's platform assembly has been fully achieved with minimal cost. The invention adds significantly to the utility of the Baker platform assembly without interfering with its other intended uses, as for climbing and supporting a user in a standing position.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. In a hunter's tree climbing platform having a platform body portion which is level during use and a folding support frame including inclined side frame members carrying aligned pivot elements, the improvement which comprises a drop seat which is level during use and which can drop by gravity to a vertical position to facilitate climbing, opposite sides of the drop seat being pivotally connected to said pivot elements and being supported thereby near the rear of the seat, and a pair of readily removable adapter legs supporting the seat near its front in said level use position, the adapter legs each having a top channel engaging element embracing a side member of the seat and each having a bottom channel engaging element embracing said inclined side frame members, the bottom channel engaging elements having their axes inclined and parallel to the axes of the side frame members and convergent with the axes of the top channel engaging elements, whereby the adapter legs are self-locking in their positions of use.

2. In a hunter's tree climbing platform as defined in claim 1, and said drop seat comprising a substantially rigid support panel, and a cushion on the support panel and detachably secured thereto.

3. In a hunter's tree climbing platform as defined in claim 2, and side channel members on said support panel to reinforce it, said top channel engaging elements embracing said side channel members during use.

4. In a hunter's tree climbing platform as defined in claim 1, said adapter legs each being rigid and unitary and each including a body portion, the top channel engaging element of each leg being fixed to the top end of the leg body portion, and the bottom channel engaging element of each leg being fixed to a side wall of said body portion.

5. In a hunter's tree climbing platform as defined in claim 4, and the axes of the top and bottom channel engaging elements converging at an angle of approximately 45 degrees and the axes intersecting substantially on the axis of the aligned pivot elements.

* * * * *